United States Patent
Kondo et al.

(10) Patent No.: US 10,539,774 B2
(45) Date of Patent: Jan. 21, 2020

(54) MICROSCOPE SYSTEM

(71) Applicant: OLYMPUS CORPORATION, Hachioji-shi, Tokyo (JP)

(72) Inventors: Kanako Kondo, Tokyo (JP); Nobuhiro Takamizawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 192 days.

(21) Appl. No.: 15/645,175

(22) Filed: Jul. 10, 2017

(65) Prior Publication Data

US 2018/0039059 A1 Feb. 8, 2018

(30) Foreign Application Priority Data

Aug. 4, 2016 (JP) .................. 2016-153929

(51) Int. Cl.
*G02B 21/00* (2006.01)
*G02B 21/36* (2006.01)
(Continued)

(52) U.S. Cl.
CPC ......... *G02B 21/365* (2013.01); *G02B 21/002* (2013.01); *G02B 21/025* (2013.01);
(Continued)

(58) Field of Classification Search
CPC .............. G02B 21/002; G02B 21/008; G02B 21/0044; G02B 21/0096; G02B 21/365; G02B 21/361; G02B 21/248; G02B 21/26; G02B 21/06; G02B 21/025; G02B 21/16; G02B 21/17; G02B 21/0004; G02B 21/0032; G02B 21/0036; G02B 21/0048; G02B 21/0076; G02B 21/03; G02B 21/10; G02B 21/63; G02B 21/65; G02B 21/645; G02B 21/6458; G01N 21/03; G01N 21/17; G01N 21/63; G01N 21/64; G01N 21/65; G01N 21/645; G01N 21/6458;
(Continued)

(56) References Cited

U.S. PATENT DOCUMENTS

2009/0015911 A1* 1/2009 Matsuo ................ G02B 21/365
359/369

FOREIGN PATENT DOCUMENTS

JP 2010216919 A * 9/2010
JP 2010216919 A 9/2010

* cited by examiner

*Primary Examiner* — Mustak Choudhury
(74) *Attorney, Agent, or Firm* — Holtz, Holtz & Volek PC

(57) ABSTRACT

Provided is a microscope system including: a plurality of objective lenses that are selectively used to collect fluorescence from a specimen; a detecting unit that obtains image information of the specimen on the basis of the fluorescence collected by the objective lens; and an adjustment unit that adjusts the observation range of the specimen S and that divides the observation range into one or more observation regions corresponding to a capture range captured by the detecting unit, wherein the adjustment unit calculates an observation magnification at which the entire well is included in the observation range, the number of observation regions is minimized, and the resolution becomes the highest, on the basis of information about the size of the well in a multi-plate for accommodating the specimen and information about an objective magnification of the objective lens, and adjusts the observation range on the basis of the calculated observation magnification.

12 Claims, 9 Drawing Sheets

(51) Int. Cl.
*G02B 21/02* (2006.01)
*G02B 21/06* (2006.01)
*G02B 21/16* (2006.01)
*G02B 21/24* (2006.01)
*G02B 21/26* (2006.01)

(52) U.S. Cl.
CPC ............. *G02B 21/06* (2013.01); *G02B 21/16* (2013.01); *G02B 21/248* (2013.01); *G02B 21/26* (2013.01); *G02B 21/361* (2013.01)

(58) Field of Classification Search
CPC ........... G01N 15/1459; G01N 15/1463; G01N 15/1468; G01N 15/1475; G01N 15/1484; G01J 3/0205; G01J 3/0294; G01J 3/44; G01J 3/0208; G01J 3/0221; G01J 3/18; G01J 3/36; G01J 3/0216; G01J 3/0229; G01J 3/0289; G01J 3/10; G01J 3/4406; A61B 3/12; A61B 3/13; A61B 3/135
USPC ....... 359/368, 369, 383, 385, 386, 391, 392; 351/205, 206, 214
See application file for complete search history.

1

MICROSCOPE SYSTEM

CROSS-REFERENCE TO RELATED APPLICATIONS

This application claims the benefit of Japanese Patent Application No. 2016-153929, the content of which is incorporated herein by reference.

Technical Field

The present invention relates to a microscope system.

Background Art

There are conventionally known microscope systems for observing a biological specimen accommodated in wells of a microplate (multi-well plate) (for example, see PTL 1). In applications in which a microplate is used, it is necessary to thoroughly image the inside of a well in which a specimen is accommodated, in order to grasp the state of the specimen; to do so, it is preferred that an observation range conforming to the shape of the well be set. Furthermore, when a biological specimen is observed, it is preferred that the time required for image acquisition be short; furthermore, in order to correctly grasp the state of the biological specimen, it is preferred that image acquisition be performed at high resolution.

The microscope described in PTL 1 is provided with a full-scan setting function for thoroughly observing the inside of the entire well when a user sets the magnification of an objective lens.

CITATION LIST

Patent Literature

{PTL 1} Japanese Unexamined Patent Application, Publication No. 2010-216919

SUMMARY OF INVENTION

According to one aspect, the present invention provides a microscope system including: a plurality of objective lenses that are selectively used to collect observation light from a specimen; an image acquisition unit that acquires an image of the specimen on the basis of the observation light collected by the objective lens; and an observation-range adjustment unit that adjusts an observation range of the specimen and that divides the observation range into one or more observation regions corresponding to a capture range captured by the image acquisition unit, wherein the observation-range adjustment unit calculates, on the basis of information about the size of an accommodation part of a vessel for accommodating the specimen and information about an objective magnification of the objective lens, an observation magnification at which the entire accommodation part is included in the observation range, the number of observation regions is minimized, and the resolution becomes the highest, and adjusts the observation range on the basis of the calculated observation magnification.

DESCRIPTION OF EMBODIMENTS

First Embodiment

A microscope system according to a first embodiment of the present invention will be described below with reference to the drawings.

Figure 1:
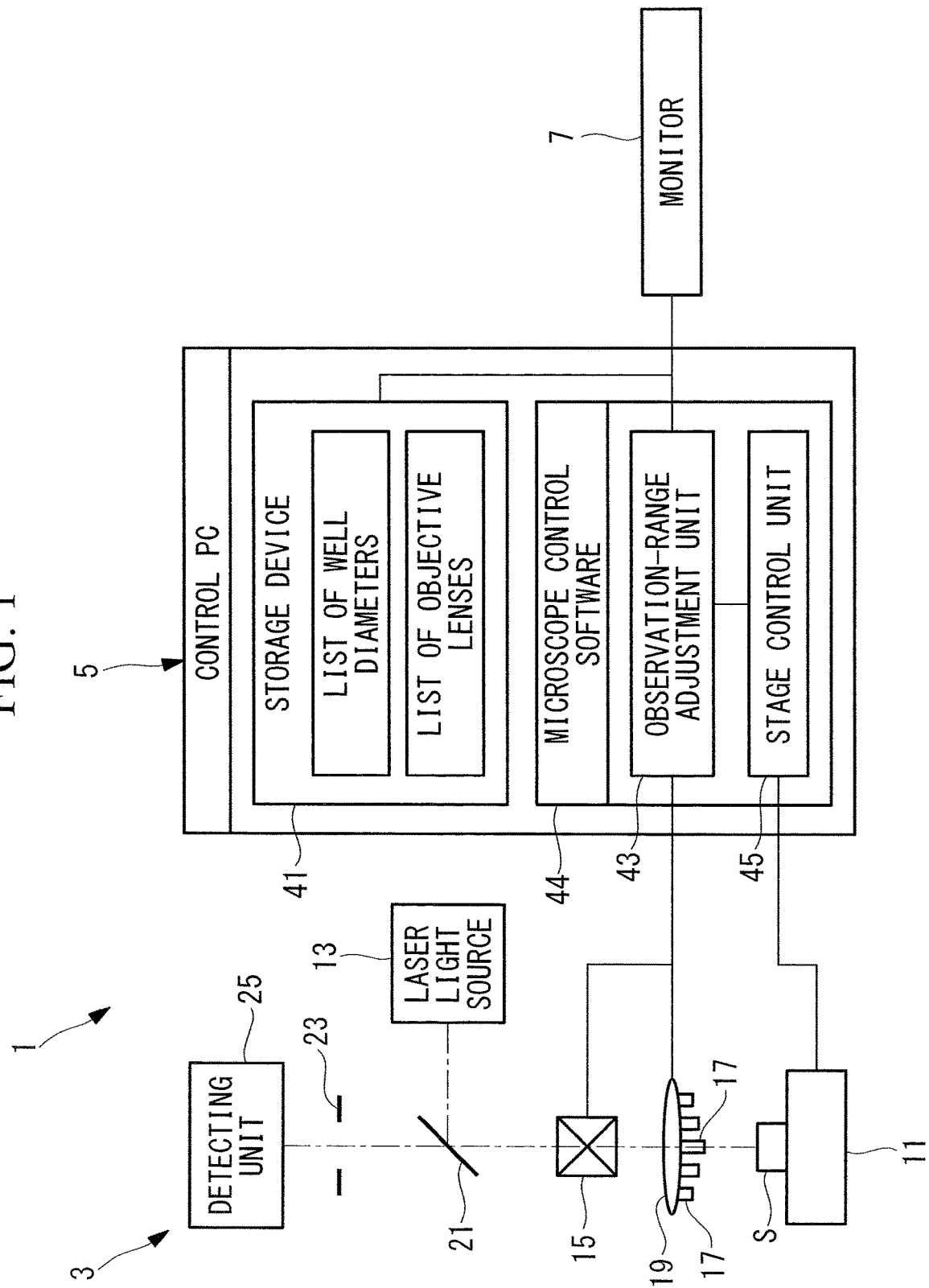
FIG. 1 is a view showing, in outline, the configuration of a microscope system according to a first embodiment of the present invention.

As shown in FIG. 1, a microscope system 1 of this embodiment is provided with a microscope body 3, a control PC 5 that controls the microscope body 3, and a monitor 7 that displays various types of information and images. An input unit (not shown), such as a mouse or a keyboard, that allows a user to input an instruction is connected to the control PC 5.

The microscope body 3 is provided with: a stage 11 on which a specimen S is placed; a laser light source 13 that produces laser light (illumination light); a scanner (scanning unit) 15 that scans laser light produced by the laser light source 13; a plurality of objective lenses 17 each of which radiates laser light scanned by the scanner 15 onto the specimen S and that collects fluorescence (observation light) from the specimen S; a revolver 19 that holds the plurality of objective lenses 17; a dichroic mirror 21 that splits off fluorescence collected by the objective lens 17 and returning along the optical path of the laser light, from the optical path of the laser light; a pinhole 23 that allows, of the fluorescence split off from the optical path of laser light by the dichroic mirror 21, fluorescence that has been produced at the focus position, in the specimen S, of the objective lens 17, to pass therethrough; and a detecting unit (image acquisition unit) 25, such as a photomultiplier tube, that detects the fluorescence passing through the pinhole 23 and that outputs image information according to the luminance of the fluorescence.

Under the control of the control PC 5, the stage 11 can be moved two-dimensionally in X and Y directions intersecting the optical axis of the objective lens 17.

As the scanner 15, a galvanometer scanner, a resonant scanner, or the like is used, for example. Under the control of the control PC 5, the scanner 15 can expand or narrow the scanning range of laser light.

As the objective lenses 17, for example, various types of objective lenses having different magnifications and media, such as 1.25× dry, 4× dry, 10× dry, 20× dry, 20× oil, and 30× silicon oil, are provided.

Under the control of the control PC 5, the revolver 19 selectively disposes one of the multiple types of objective lenses 17, on the optical path of fluorescence.

The dichroic mirror 21 reflects laser light from the laser light source 13 toward the scanner 15 and allows fluorescence returning, on the optical path of laser light, from the specimen S via the scanner 15 to transmit therethrough toward the pinhole 23.

Figure 2:
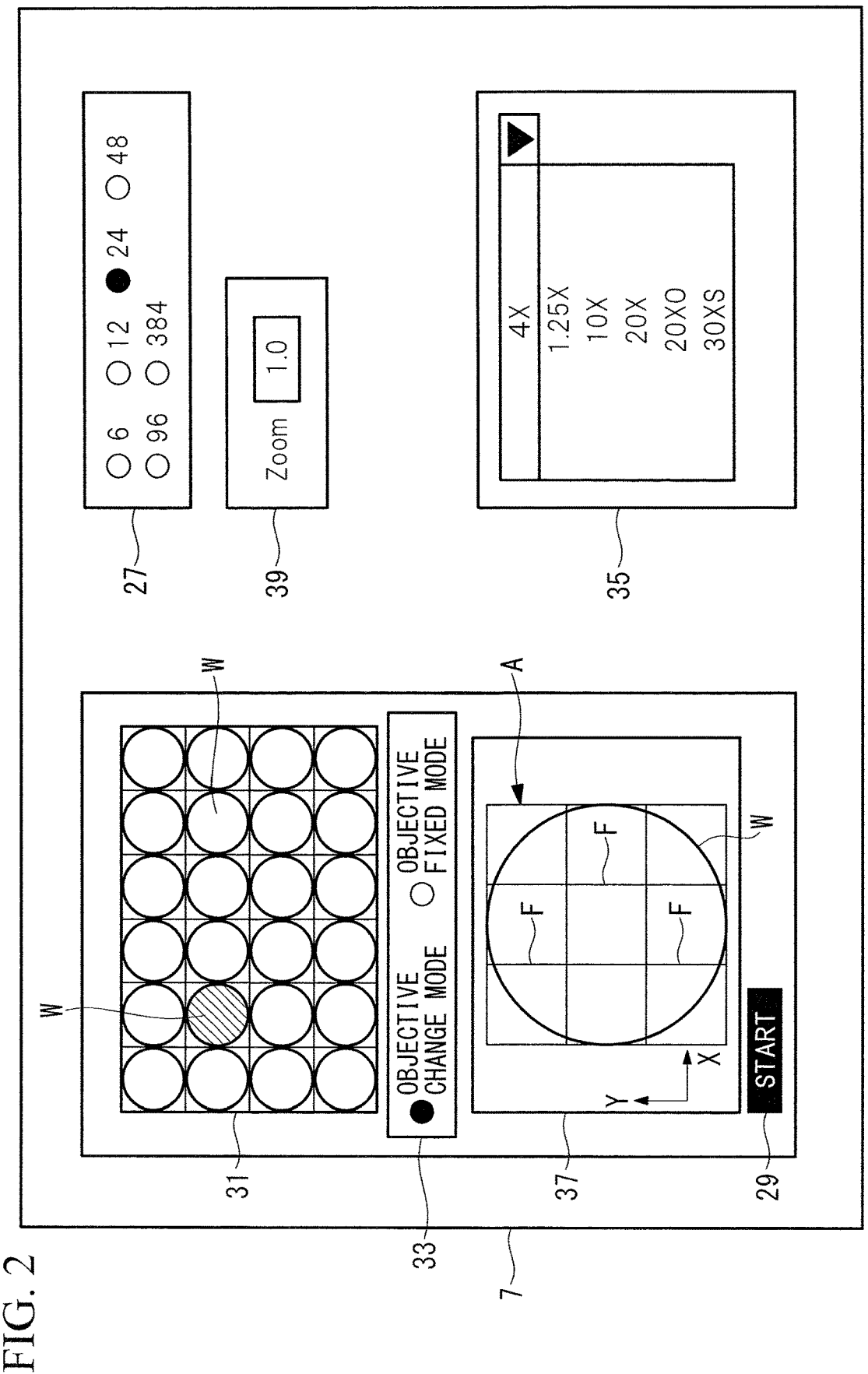
FIG. 2 is a view showing example GUIs displayed on a monitor shown in FIG. 1.
Figure 3:
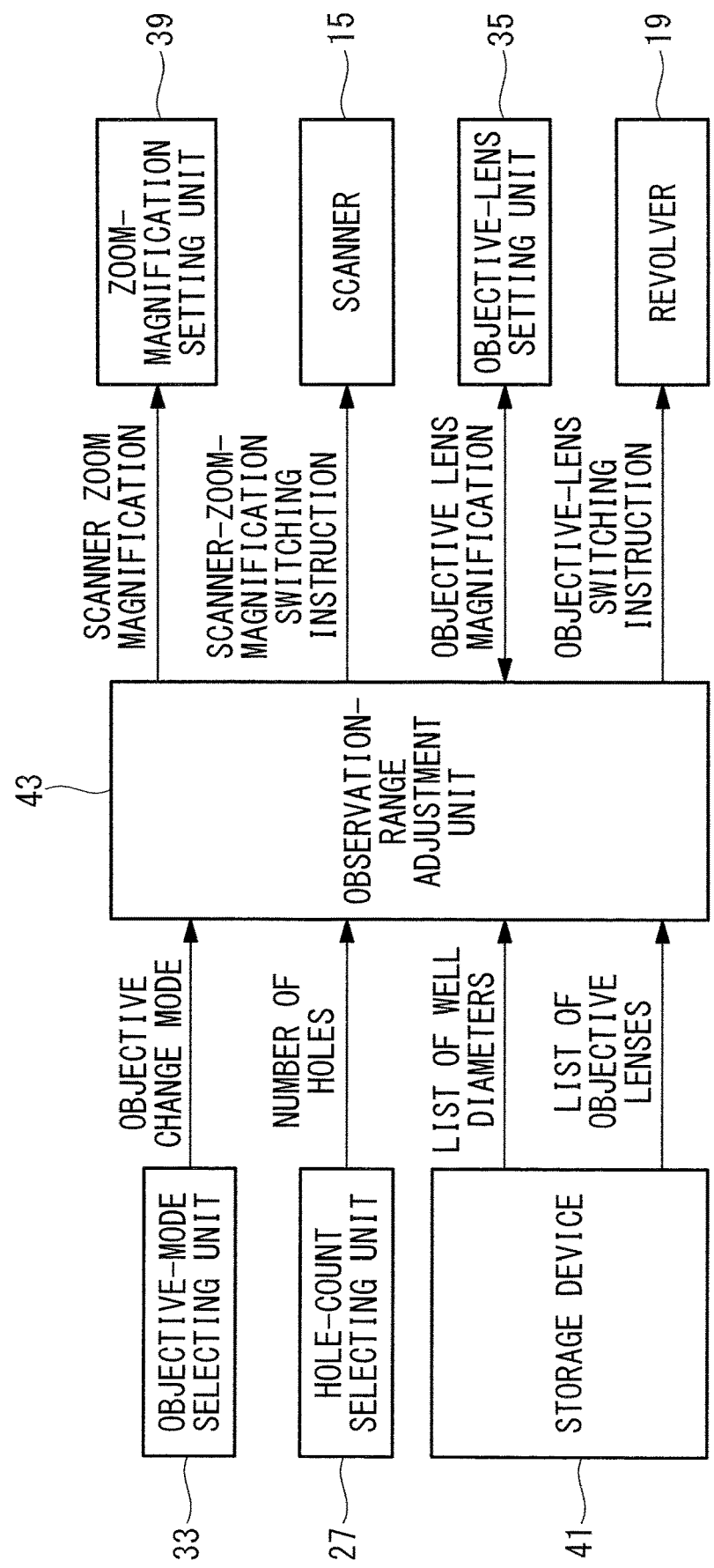
FIG. 3 is a block diagram for explaining processing performed by an observation-range adjustment unit.

Microscope control software 44 is installed in the control PC 5. By means of the microscope control software 44, as shown in FIGS. 2 and 3, the following GUIs for allowing a user to set parameters are displayed on the monitor 7: a hole-count selecting unit 27, an observation-range automatic-setting instructing unit 29, a well specifying unit 31, an objective-mode selecting unit (mode switching unit) 33, an objective-lens setting unit 35, an observation-range display unit 37, and a zoom-magnification setting unit 39.

The hole-count selecting unit 27 allows a user to select the number (hole count) of wells (accommodation parts) in a microplate (vessel). The microscope system 1 holds, in advance, data in which the numbers of wells and well diameters are associated, and, when the user selects the number of wells, the well diameter is determined.

The observation-range automatic-setting instructing unit 29 functions as a start button for instructing automatic setting of an observation range.

The well specifying unit 31 allows the user to specify a well serving as an observation target. In FIG. 2, reference sign W indicates a well.

The objective-mode selecting unit 33 allows the user to select between an objective fixed mode (fixed mode) in which the objective lens 17 currently disposed on the optical path of fluorescence is used and an objective change mode (change mode) in which one of all objective lenses 17 held by the revolver 19 is selected and is used.

While the objective change mode is set, when an immersion objective lens (for example, 20× oil, 30× silicon oil) is set on the optical path, the mode is automatically switched to the objective fixed mode. Furthermore, when an immersion objective lens is set on the optical path, the user cannot switch from the objective fixed mode to the objective change mode. On the other hand, when a dry objective lens (for example, 1.25× dry, 4× dry, 10× dry, 20× dry) is set on the optical path, the user can select either one of the objective change mode and the objective fixed mode.

The objective-lens setting unit 35 allows the user to set an objective lens 17 to be used.

The observation-range display unit 37 displays the observation range of the specimen S.

The zoom-magnification setting unit 39 displays the zoom magnification of the scanner 15.

Furthermore, the control PC 5 is provided with: a storage device 41 that stores various types of information; an observation-range adjustment unit 43 that adjusts the observation range of the specimen S on the basis of parameters set by the user by means of the GUIs; and a stage control unit 45 that controls the stage 11. The observation-range adjustment unit 43 and the stage control unit 45 are held by the installed microscope control software 44.

The storage device 41 stores a list of well diameters according to the microplate types and a list of information about the magnifications and the media of the objective lenses 17 held by the revolver 19.

The observation-range adjustment unit 43 adjusts the observation range of the specimen S on the basis of an observation-range adjustment program and divides the observation range into at least one observation region corresponding to the capture range captured by the detecting unit 25. In FIG. 2, reference sign A indicates an observation range, and reference sign F indicates observation regions.

Specifically, the observation-range adjustment unit 43 extracts, from the storage device 41, objective lenses 17 that serve as calculation targets, in the form of a list of switchable objective lenses.

For example, when any of the dry objective lenses 17 is currently selected, only dry objective lenses are extracted as candidates. In the example shown in this embodiment, a 1.25× dry objective lens 17, a 4× dry objective lens 17, a 10× dry objective lens 17, and a 20× dry objective lens 17 are extracted.

Furthermore, the observation-range adjustment unit 43 calculates observation magnifications at which the entire well is included in the observation range, the number of observation regions is minimized, and the resolution becomes the highest, on the basis of information about the size of a well in the microplate specified by the user and information of a list of the extracted objective lenses. Calculated as the observation magnifications are: the zoom magnification of the scanner 15; and the objective magnification of the objective lens 17 to be used. Then, the observation-range adjustment unit 43 adjusts the observation range of the specimen S on the basis of the calculated zoom magnification of the scanner 15 and objective magnification of the objective lens 17.

The stage control unit 45 moves the stage 11 two-dimensionally in the X and Y directions, for each observation region divided by the observation-range adjustment unit 43, so as to locate the optical axis of the objective lens 17 at the center of that observation region, on the basis of a stage control program.

The operation of the thus-configured microscope system 1 will be described.

In this embodiment, a description will be given of a case in which the wells of the microplate, each accommodating the specimen S, are observed in the objective change mode by using the microscope system 1.

It is assumed that the 10× dry objective lens 17 selected by the user by means of the objective-lens setting unit 35 on the monitor 7 is disposed on the optical path.

First, the user selects the number of holes in the microplate by means of the hole-count selecting unit 27 on the monitor 7. In the example shown in FIG. 2, 24 is selected as the number of holes, and thus, 24 wells W are displayed on the well specifying unit 31. Furthermore, the user specifies a well W that serves as an observation target, by means of the well specifying unit 31 on the monitor 7. Then, the user sets the objective change mode by means of the objective-mode selecting unit 33 on the monitor 7.

Next, when the user gives an instruction to start setting by means of the observation-range automatic-setting instructing unit 29 on the monitor 7, the observation-range adjustment unit 43 executes processing on the basis of the observation-range adjustment program. First, the observation-range adjustment unit 43 reads a list of well diameters from the storage device 41, as shown in FIG. 3, checks, against the list, the hole-count information of the microplate selected by means of the hole-count selecting unit 27, and determines the diameter of the well specified as an observation target.

Next, the observation-range adjustment unit 43 reads a list of objective lenses from the storage device 41, reads information about the currently selected objective lens 17 from the objective-lens setting unit 35, and extracts objective lenses 17 that serve as calculation targets, in the form of a list of switchable objective lenses.

Because the 10× dry objective lens 17 is currently selected, the observation-range adjustment unit 43 extracts the 1.25× dry objective lens 17, the 4× dry objective lens 17, the 10× dry objective lens 17, and the 20× dry objective lens 17, in the form of a list of switchable objective lenses.

Next, the observation-range adjustment unit 43 calculates the optimum zoom magnification of the scanner 15 and the optimum objective magnification of the objective lens 17, from the determined well diameter and the extracted list of switchable objective lenses.

Figure 4:
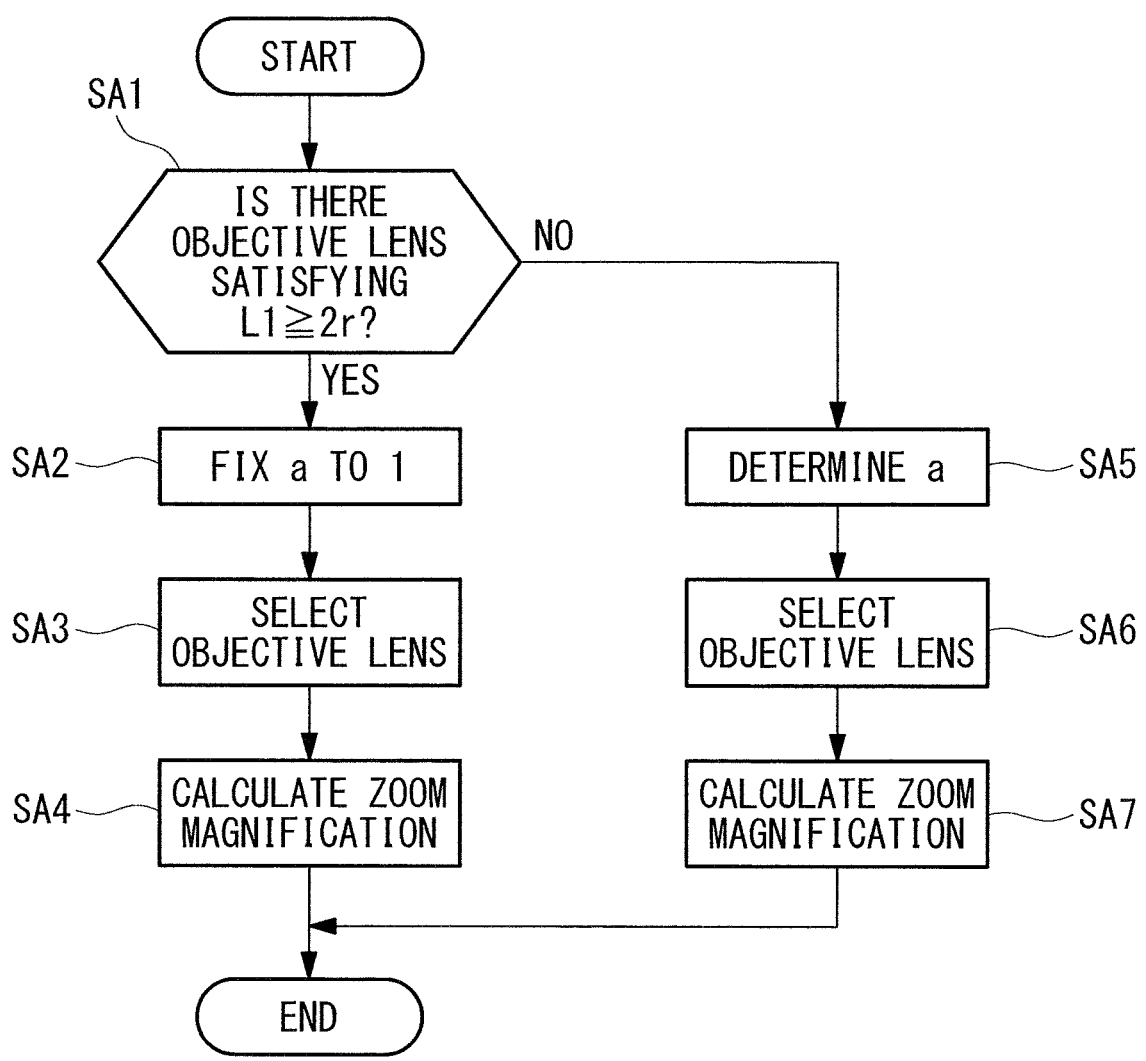
FIG. 4 is a flowchart for explaining a calculation method for calculating the optimum zoom magnification of a scanner and the optimum objective magnification of an objective lens.

A method for calculating the optimum zoom magnification of the scanner 15 and the optimum objective magnification of the objective lens 17, used by the observation-range adjustment unit 43, will be described below with reference to a flowchart of FIG. 4.

First, the list of objective lenses is searched for an objective lens 17 that has an objective magnification at which the well diameter 2r (μm) does not exceed the length L1 (μm) of a side of the observation region obtained when the zoom magnification of the scanner 15 is 1×, i.e., at which L1≥2r is satisfied (Step SA1).

Here, the length L1 (μm) of a side of the observation region obtained when the zoom magnification of the scanner 15 is 1× is calculated by L1=(1800 μm×√2)×(10/MO). MO is the objective magnification of the currently selected objective lens 17.

When there is an objective lens 17 that has an objective magnification for satisfying L1≥2r, the number of observation regions a in the X and Y directions is fixed to 1 (Step SA2), and the objective magnification thereof is calculated. When the objective lens 17 that has an objective magnification for satisfying L1≥2r is used, the observation-range adjustment unit 43 divides the observation range A into one observation region F, as shown in FIGS. 5A and 5B, for example.

Figure 5A:
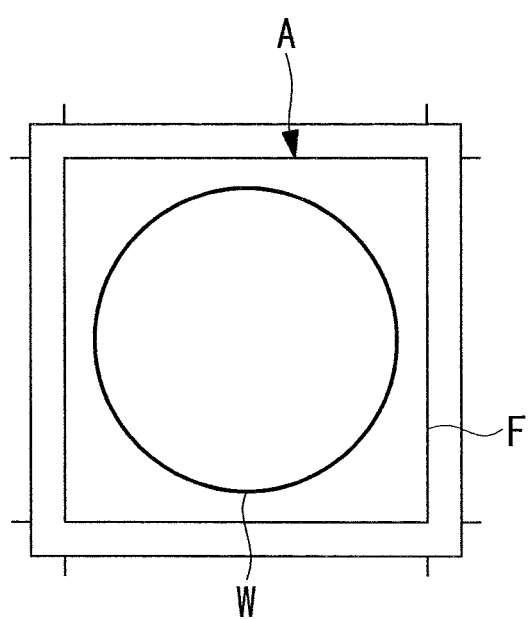
FIG. 5A is a view showing an example observation range when an objective lens having an objective magnification at which a=1 is used.
Figure 5B:
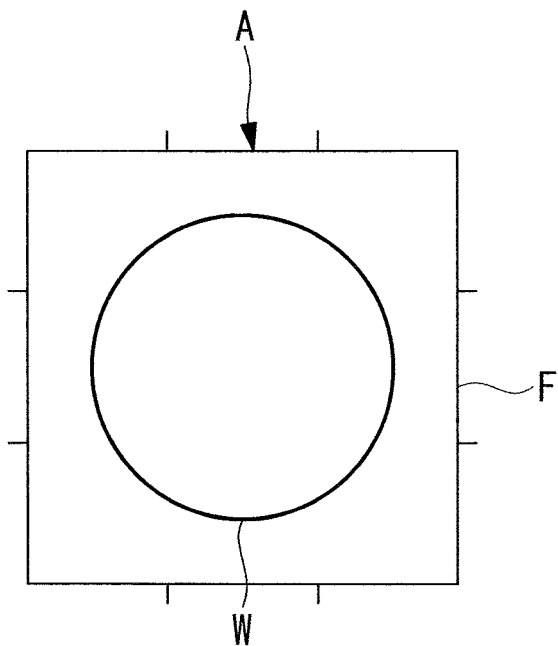
FIG. 5B is a view showing an example observation range when another objective lens having an objective magnification at which a=1 is used.

If there are a plurality of objective lenses 17 with which a=1, as in FIGS. 5A and 5B, an objective lens 17 that has the highest objective magnification is selected (in this case, FIG. 5A), and, if there is only one objective lens 17 with which a=1, that objective lens 17 is selected (Step SA3).

After the objective lens 17 is selected, because a=1 in this case, a zoom magnification of the scanner 15 for satisfying L1×(1/MZ)=2r is calculated (Step SA4). MZ is the zoom magnification of the scanner 15 to be calculated. When the value of MZ has a fraction, the zoom magnification is reduced by the fraction such that the well is included in the observation range A. The number of decimal digits to be rounded down may be desirably set by the user.

Returning to Step SA1, if there is no objective lens 17 that has an objective magnification for satisfying L1≥2r, the minimum number of observation regions a in the X and Y directions for satisfying L1×a≥2r is determined among all objective lenses 17 held by the revolver 19 (Step SA5), and the objective magnification thereof is calculated. For example, when an objective lens 17 that has an objective magnification at which a=2 is used, the observation-range adjustment unit 43 divides the observation range into four observation regions F, as shown in FIGS. 6A and 6B.

Figure 6A:
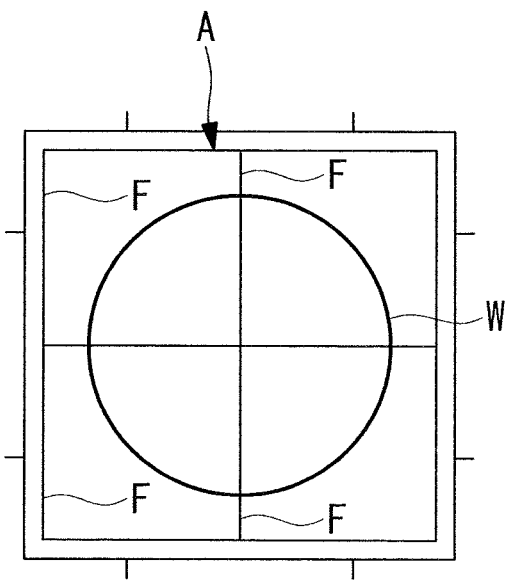
FIG. 6A is a view showing an example observation range when an objective lens having an objective magnification at which a=2 is used.
Figure 6B:
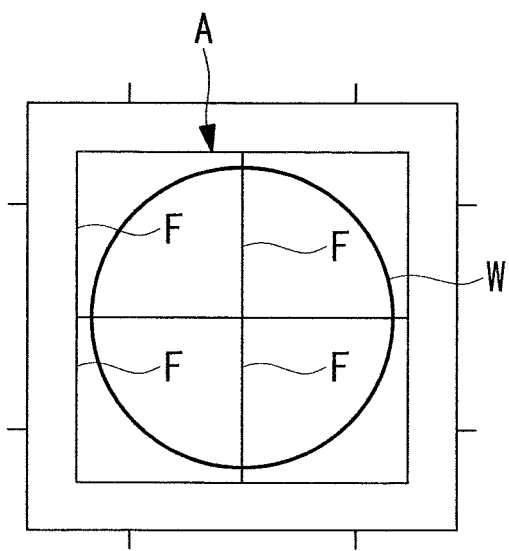
FIG. 6B is a view showing an example observation range when another objective lens having an objective magnification at which a=2 is used.

If there are a plurality of objective lenses 17 that have objective magnifications at which the number of observation regions a in the X and Y directions becomes the minimum, as in FIGS. 6A and 6B, the objective lens 17 that has the highest objective magnification is selected (in this case, FIG. 6B), and, if there is only one objective lens 17 that has such an objective magnification, that objective lens 17 is selected (Step SA6).

After the objective lens 17 is selected, because a≠1 in this case, a zoom magnification of the scanner 15 for satisfying L1×(1/MZ)×a=2r is calculated (Step SA7). When the value of MZ has a fraction, the zoom magnification is reduced by the fraction such that the well is included in the observation range A.

The number of observation regions a in the X and Y directions is set to 1, or the number of observation regions a is set to the minimum even if a cannot be set to 1, thereby making it possible to reduce the time required for image acquisition as much as possible. Furthermore, the zoom magnification is set to a value at which the observation range becomes substantially equal to the outer diameter of the well, thereby making it possible to reduce unnecessary imaging of a region outside the well, thus improving the resolution, compared with a zoom magnification at which the observation range becomes larger than the outer diameter of the well.

When the optimum zoom magnification of the scanner 15 and the optimum objective magnification of the objective lens 17 are determined, the observation-range adjustment unit 43 sends information about the calculated zoom magnification of the scanner 15 to the zoom-magnification setting unit 39 and also sends information about the calculated objective magnification of the objective lens 17 to the objective-lens setting unit 35, as shown in FIG. 3.

Then, the observation-range adjustment unit 43 sends the observation range to the observation-range display unit 37 and, at the same time, instructs the scanner 15 to switch the zoom magnification and instructs the revolver 19 to switch the objective lens 17. Accordingly, new zoom magnification and objective lens 17 are selected, the observation range is divided into a × a observation areas in the X and Y directions, and a region located outside the well is deleted, thus changing the observation range to an observation range that is close to the outer diameter of the well.

For example, when the number of holes in the microplate is 96, the diameter of a well is 6.35 mm, the objective magnification of the selected objective lens 17 is 10×, and the zoom magnification of the scanner 15 is 1×, the length of a side of the observation region becomes 1.27 mm.

Figure 7:
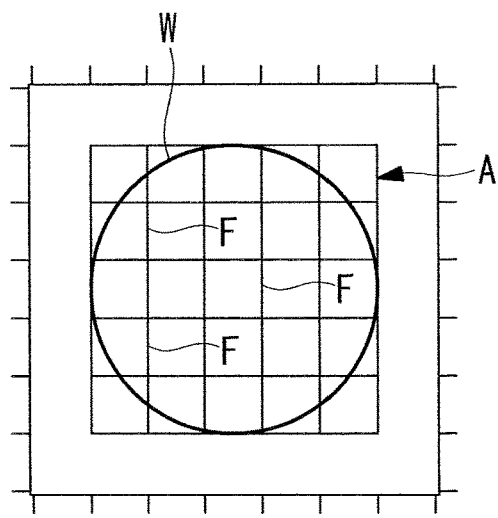
FIG. 7 is a view showing an example observation range when a conventional microscope system is used.

In this case, as a reference example, in a conventional microscope system, the currently selected objective lens 17 having the objective magnification of 10× is still used, and, as shown in FIG. 7, the number of observation regions F required to acquire an observation image of the entire well W becomes 25.

Figure 8:
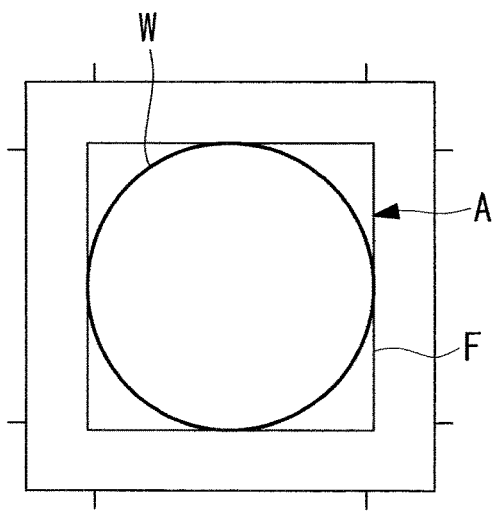
FIG. 8 is a view showing an example observation range when a 1.25× dry objective lens is used in an objective change mode by the microscope system shown in FIG. 1.
Figure 9:
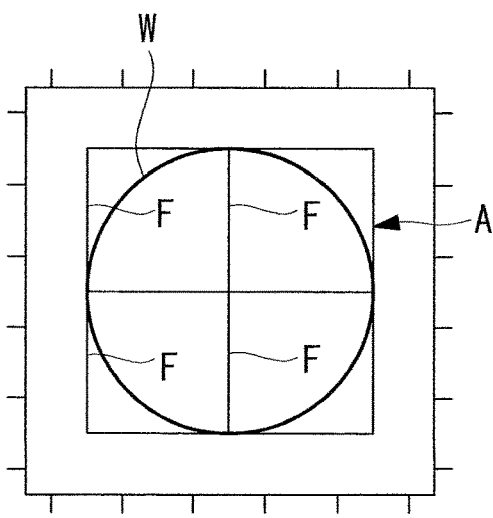
FIG. 9 is a view showing an example observation range when a 4× dry objective lens is used in the objective change mode by the microscope system shown in FIG. 1.

In contrast to this, according to the microscope system 1 of this embodiment, the observation-range adjustment unit 43 sets the 1.25× dry objective lens 17 and sets the zoom magnification of the scanner 15 to 1.6×. In this case, as shown in FIG. 8, the number of observation regions F is one, and the observation range A that is close to the outer diameter of the well W is set. If the 1.25× dry objective lens 17 is not provided, the 4× dry objective lens 17 is set, and the zoom magnification of the scanner 15 is set to 1.0×. In this case, as shown in FIG. 9, the number of observation regions F is four, and an observation range A that is close to the outer diameter of the well W is set.

Next, while the selected objective lens 17 is used, and the stage 11 is moved to each observation region by the stage control unit 45 according to the stage control program, scanning of laser light on each observation region at the set zoom magnification of the scanner 15 is sequentially performed, thus acquiring an image of the entire well.

As described above, according to the microscope system 1 of this embodiment, the observation range is adjusted on the basis of the observation magnifications calculated by the observation-range adjustment unit 43, thereby making it possible to minimize the number of observation regions required to thoroughly observe the entire well and to set an observation range for preventing imaging of an unnecessary region outside the well as much as possible. Accordingly, the inside of the well can be imaged in a shorter time because of the minimized number of observation regions and at higher resolution because of the reduced unnecessary imaging of a region outside the well due to the zoom magnification.

Second Embodiment

Next, a microscope system according to a second embodiment of the present invention will be described.

In this embodiment, a description will be given of a case in which wells of the microplate, each accommodating the specimen S, are observed in the objective fixed mode by using the microscope system 1.

Identical reference signs are assigned to components having configurations common to those in the microscope system 1 according to the first embodiment, and a description thereof will be omitted.

In this embodiment, it is assumed that the 4× dry objective lens 17 selected by the user by means of the objective-lens setting unit 35 on the monitor 7 is disposed on the optical path.

The user selects the number of holes in the microplate, specifies a well that serves as an observation target, and then sets the objective fixed mode by means of the objective-mode selecting unit 33 on the monitor 7.

Figure 10:
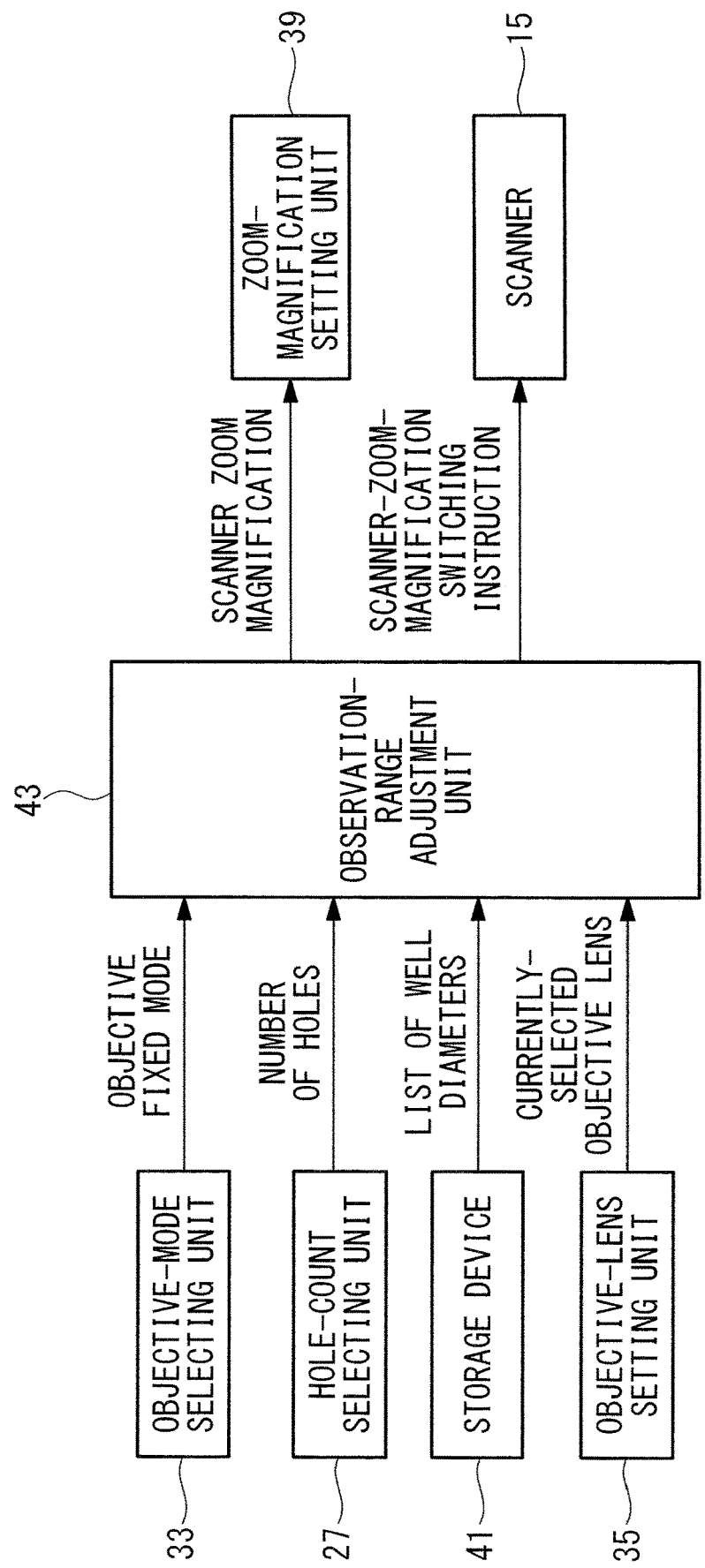
FIG. 10 is a block diagram for explaining processing performed by the observation-range adjustment unit.

Next, when the user gives an instruction to start setting by means of the observation-range automatic-setting instructing unit 29, the observation-range adjustment unit 43 determines the diameter of the well specified as an observation target by the user and reads the objective magnification of the currently selected objective lens 17 from the objective-lens setting unit 35, as shown in FIG. 10. Then, the observation-range adjustment unit 43 calculates the optimum zoom magnification of the scanner 15 on the basis of the determined diameter of the well and the objective magnification of the currently selected objective lens 17.

Figure 11:
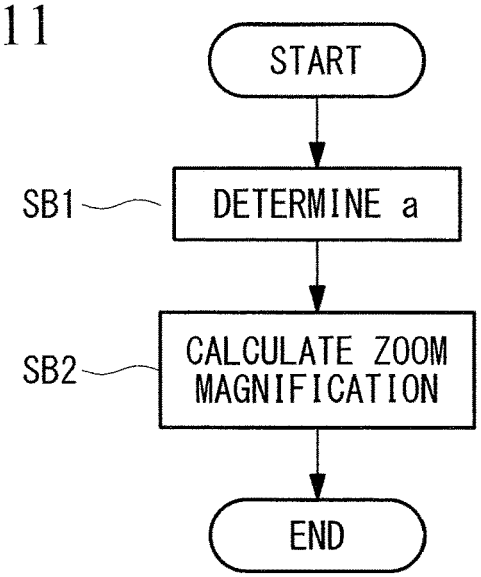
FIG. 11 is a flowchart for explaining a calculation method for calculating the optimum zoom magnification of the scanner.

A method for calculating the optimum zoom magnification of the scanner 15, used by the observation-range adjustment unit 43, will be described below with reference to a flowchart of FIG. 11.

First, the minimum number of observation regions a in the X and Y directions for satisfying L1×a≥2r is determined (Step SB1).

Next, the zoom magnification of the scanner 15 for satisfying L1×(1/MZ)×a=2r is calculated (Step SB2). When the value of MZ has a fraction, the zoom magnification is reduced by the fraction such that the well is included in the observation range A.

The number of observation regions a in the X and Y directions is minimized, thereby making it possible to reduce the time required for image acquisition as much as possible, and the zoom magnification is set to a value at which the observation range becomes substantially equal to the outer diameter of the well, thereby making it possible to reduce unnecessary imaging of a region outside the well, thus improving the resolution.

When the optimum zoom magnification of the scanner 15 is determined, the observation-range adjustment unit 43 sends information about the calculated zoom magnification of the scanner 15 to the zoom-magnification setting unit 39, as shown in FIG. 10. Then, the observation-range adjustment unit 43 sends the observation range to the observation-range display unit 37 and, at the same time, instructs the scanner 15 to switch the zoom magnification.

Accordingly, the currently-selected 4× dry objective lens 17 is still used, the new zoom magnification is selected, the observation range is divided into a x a observation regions in the X and Y directions, and a region located outside the well is deleted, thus changing the observation range to an observation range that is close to the outer diameter of the well.

For example, when the number of holes in the microplate is 96, the diameter of the well is 6.35 mm, the objective magnification of the selected objective lens 17 is 4×, and the zoom magnification of the scanner 15 is 2×, the length of a side of each observation region becomes 1.59 mm.

Figure 12:
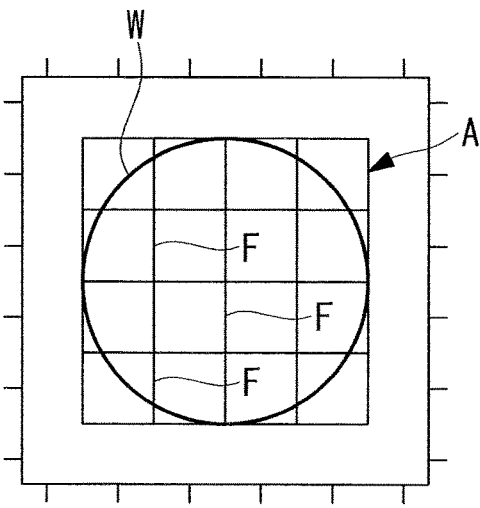
FIG. 12 is a view showing an example observation range when a conventional microscope system is used.

In this case, as a reference example, in a conventional microscope system, the currently selected objective lens 17 having the objective magnification of 4× is still used, and, as shown in FIG. 12, the number of observation regions F required to acquire an observation image of the entire well W becomes 16.

Figure 13:
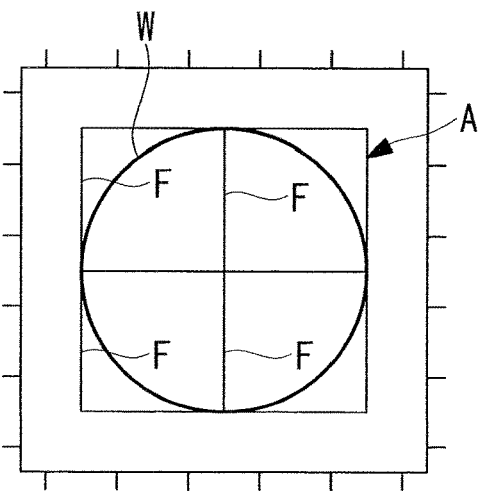
FIG. 13 is a view showing an example observation range when a 4× dry objective lens is used in an objective fixed mode by the microscope system shown in FIG. 1.

In contrast to this, according to the microscope system 1 of this embodiment, the observation-range adjustment unit 43 still uses the currently-selected 4× dry objective lens 17 and sets the zoom magnification of the scanner 15 to 1×. In this case, as shown in FIG. 13, the number of observation regions F is four, and an observation range A that is close to the outer shape of the well W is set.

As described above, according to the microscope system 1 of this embodiment, while an objective lens 17 desired by the user is used, it is possible to minimize the number of observation regions required to thoroughly observe the entire well and to set an observation range for preventing imaging of an unnecessary region outside the well as much as possible. Accordingly, the inside of the well can be imaged in a shorter time and at high resolution.

Although the embodiments of the present invention have been described above in detail with reference to the drawings, the specific configurations are not limited to those embodiments, and design changes etc. that do not depart from the scope of the present invention are also encompassed. For example, the present invention is not limited to those applied to the above-described embodiments and modification, and may be applied to embodiments obtained by appropriately combining those embodiments and modification, without particular limitation.

Figure 14:
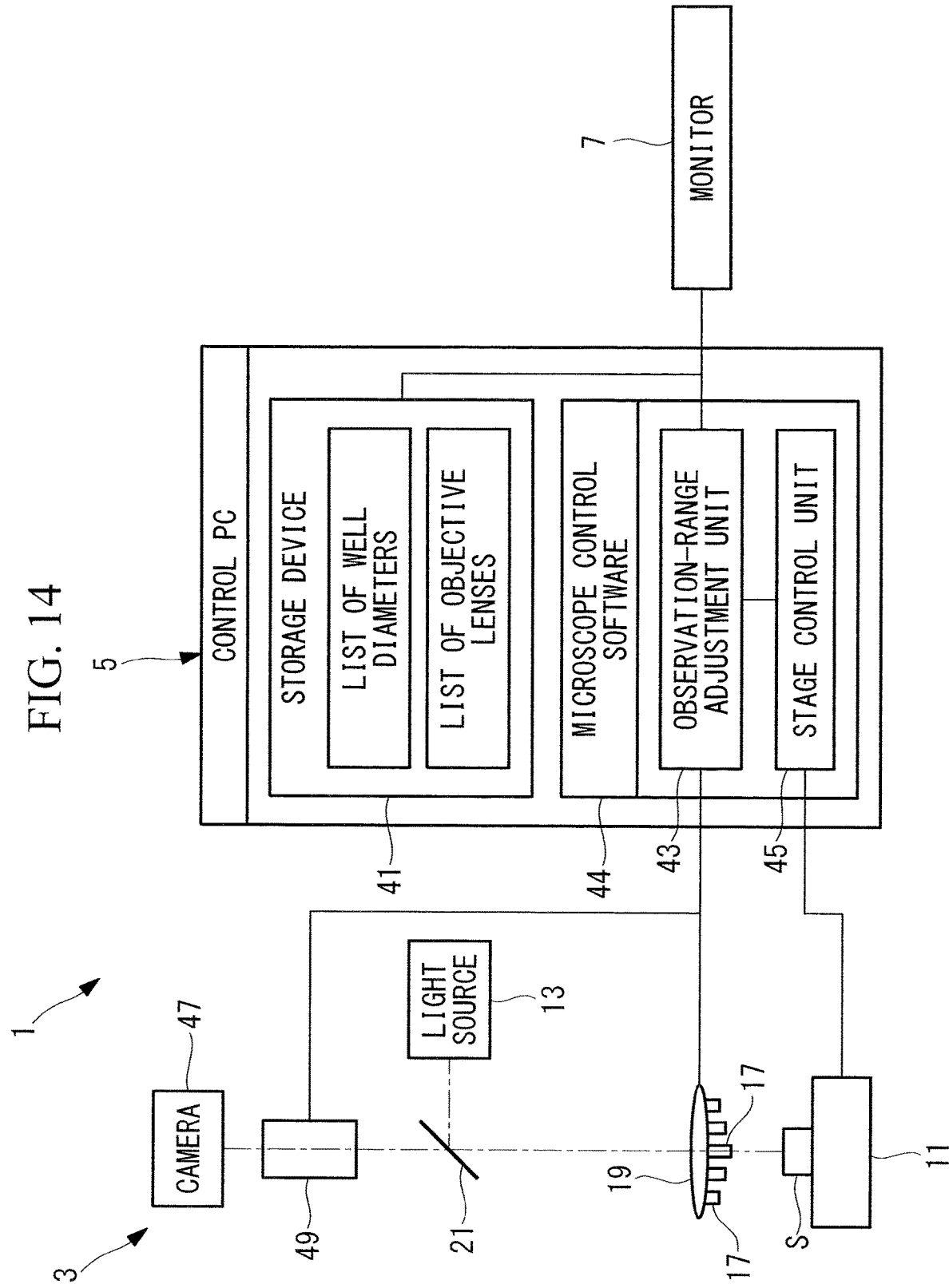
FIG. 14 is a view showing, in outline, the configuration of a microscope system according to a modification of the above-described embodiments.

Furthermore, in the above-described embodiments, although the detecting unit 25, such as a photomultiplier tube, has been illustrated as an image acquisition unit, instead of this, as shown in FIG. 14, it is also possible to adopt a camera 47, such as a CCD, as an image acquisition unit, and to acquire an image by capturing, with the camera 47, observation light reflected at the specimen S onto which illumination light has been radiated. In this case, instead of the scanner 15 and the pinhole 23, a variable-magnification optical system 49 may be disposed on the optical path between the dichroic mirror 21 and the camera 47, and the observation-range adjustment unit 43 may change the zoom magnification of the variable-magnification optical system 49. In this case, the same effect as those in the above-described embodiments can also be obtained.

From the above-described embodiments, the following inventions are derived.

According to one aspect, the present invention provides a microscope system including: a plurality of objective lenses that are selectively used to collect observation light from a specimen; an image acquisition unit that acquires an image of the specimen on the basis of the observation light collected by the objective lens; and an observation-range adjustment unit that adjusts an observation range of the specimen and that divides the observation range into one or more observation regions corresponding to a capture range captured by the image acquisition unit, wherein the observation-range adjustment unit calculates, on the basis of information about the size of an accommodation part of a vessel for accommodating the specimen and information about an objective magnification of the objective lens, an observation magnification at which the entire accommodation part is included in the observation range, the number of observation regions is minimized, and the resolution becomes the highest, and adjusts the observation range on the basis of the calculated observation magnification.

According to this aspect, in each of the observation regions of the observation range divided by the observation-range adjustment unit, the objective lens collects observation light from the specimen, and the image acquisition unit acquires an image.

Therefore, the observation range is adjusted on the basis of the observation magnification calculated by the observation-range adjustment unit, thereby making it possible to minimize the number of observation regions required to thoroughly observe the entire accommodation part and to set an observation range for preventing imaging of an unnecessary portion. Accordingly, the inside of the well can be imaged in a shorter time and at high resolution.

The above-described aspect may further include a scanning unit that scans, on the specimen, illumination light produced by a light source, wherein the observation-range adjustment unit may change a zoom magnification used by the scanning unit, on the basis of the observation magnification.

As the zoom magnification of the scanning unit is reduced, the scanning range of illumination light is expanded, and as the zoom magnification thereof is increased, the scanning range of illumination light is narrowed. Therefore, with this configuration, the observation range can be easily adjusted with a simple configuration in which only the zoom magnification of the scanning unit is changed.

The above-described aspect may further include a variable-magnification optical system, wherein the observation-range adjustment unit may change a zoom magnification of the variable-magnification optical system on the basis of the observation magnification.

As the zoom magnification of the variable-magnification optical system is reduced, the observation range is expanded, and, as the zoom magnification thereof is increased, the observation range is narrowed. With this configuration, the observation range can be easily adjusted with a simple configuration in which only the zoom magnification of the variable-magnification optical system is changed.

In the above-described aspect, the plurality of objective lenses may have objective magnifications different from each other; and the observation-range adjustment unit may change the objective lens to be disposed on the optical path of the observation light.

When the entire vessel is included in the observation range, the number of observation regions into which the observation range is divided is determined according to the relationship between the size of the accommodation part and the objective magnification of the objective lens to be used; therefore, with this configuration, the observation range can be divided by the number of observation regions corresponding to the objective magnification of the objective lens disposed on the optical path of the observation light.

The above-described aspect may further include a mode switching unit that can switch between a fixed mode in which the objective lens that is disposed on the optical path of the observation light is used and a change mode in which any of the plurality of objective lenses is selected and is used, wherein, in the fixed mode, the observation-range adjustment unit may divide the observation range on the basis of the objective magnification of the objective lens that is disposed on the optical path of the observation light and, in the change mode, may divide the observation range on the basis of the objective magnification of the objective lens, among the plurality of objective lenses, at which the entire accommodation part is included in the observation range and at which the number of observation regions is minimized.

With this configuration, an objective lens desired by the user is used in the fixed mode, and an objective lens, among the plurality of provided objective lenses, with which the number of observation regions is minimized is used in the change mode, thereby making it possible to minimize the number of observation regions required to thoroughly observe the entire well and to set an observation range for preventing imaging of an unnecessary portion.

For example, when an immersion objective lens is set on the optical path in the change mode, the mode may be automatically switched to the fixed mode. Furthermore, while an immersion objective lens is set on the optical path, it is possible to prevent the user from switching from the fixed mode to the change mode. On the other hand, while a dry objective lens is set on the optical path, it is possible to allow the user to select either one of the change mode and the fixed mode.

The above-described aspect may further include: a stage on which the specimen is placed and that can be moved in a direction intersecting the optical axis of the objective lens; and a stage control unit that moves, in each of the observation regions divided by the observation-range adjustment unit, the stage so as to locate the optical axis of the objective lens at the center of that observation region.

With this configuration, in the respective observation regions divided by the observation-range adjustment unit, the image acquisition unit can acquire images of the specimen, thus generating an image over the entire observation range.

REFERENCE SIGNS LIST 1 microscope system
11 stage
15 scanner (scanning unit)
17 objective lens
25 detecting unit (image acquisition unit)
33 objective-mode selecting unit (mode switching unit)
43 observation-range adjustment unit
45 stage control unit
47 camera (image acquisition unit)
49 variable-magnification optical system
S specimen
W well (accommodation part)

The invention claimed is:

1. A microscope system comprising:
a plurality of objective lenses that are selectively used to collect observation light from a specimen, each of the plurality of objective lenses being able to be selectively disposed on an optical path of the observation light;
an objective-lens setting unit;
a zoom-magnification setting unit;
an image acquisition unit that acquires an image of the specimen based on the observation light collected by the objective lens;
a vessel that includes an accommodation part for accommodating the specimen; and
a computer that is configured to operate as:
a mode selecting unit by which a user can select between (i) a fixed mode in which the objective lens, from among the plurality of objective lenses, that is currently disposed on the optical path is used, and (ii) a change mode in which one of the plurality of objective lenses is selected and used; and
an observation-range adjustment unit that sets a range including an entirety of the accommodation part as an observation range and that divides the observation range into at least one observation region, each of the at least one observation region corresponding to a capture range captured by the image acquisition unit,
wherein:
when the fixed mode is selected, the observation-range adjustment unit calculates, based on information about at least one of a radius and a diameter of the accommodation part and information about a magnification of the objective lens that is currently disposed on the optical path, an observation magnification at which a number of the at least one observation region into which the observation range is divided is minimized and a resolution is maximized, and changes a zoom magnification of the zoom-magnification setting unit based on the calculated observation magnification, and
when the change mode is selected, the observation-range adjustment unit calculates, based on the information about at least one of the radius and the diameter of the accommodation part and information about respective magnifications of the plurality of objective lenses, the observation magnification at which the number of the at least one observation region into which the observation range is divided is minimized and the resolution is maximized, and changes, based on the calculated observation magnification, (i) an objective magnification by controlling which of the plurality of objective lenses is disposed on the optical path by control of the objective-lens setting unit and (ii) the zoom magnification of the zoom magnification setting unit.

2. The microscope system according to claim 1, further comprising a scanning unit that scans, on the specimen, illumination light produced by a light source,
wherein a scanning range of the scanning unit changes based on the zoom magnification.

3. The microscope system according to claim 1, further comprising a variable-magnification optical system,
wherein the zoom-magnification setting unit changes the zoom magnification by control of the variable-magnification optical system.

4. The microscope system according to claim 1, further comprising:
a stage on which the specimen is placed, the stage being movable in a direction intersecting an optical axis of the objective lens; and
a stage control unit that moves, for each of the at least one observation region divided by the observation-range adjustment unit, the stage so as to locate the optical axis of the objective lens at a center of that observation region.

5. A microscope system comprising:
a plurality of objective lenses that are selectively used to collect observation light from a specimen, each of the plurality of objective lenses being able to be selectively disposed on an optical path of the observation light;
a photomultiplier tube that acquires an image of the specimen based on the observation light collected by the objective lens;
a vessel that includes an accommodation part for accommodating the specimen; and
a computer that is configured to operate as:
a mode selecting unit by which a user can select between (i) a fixed mode in which the objective lens, from among the plurality of objective lenses, that is currently disposed on the optical path is used, and (ii) a change mode in which one of the plurality of objective lenses is selected and used; and
an observation-range adjustment unit that sets a range including an entirety of the accommodation part as an observation range and that divides the observation range into at least one observation region, each of the at least one observation region corresponding to a capture range captured by the photomultiplier tube,
wherein:
when the fixed mode is selected, the observation-range adjustment unit calculates, based on information about at least one of a radius and a diameter of the accommodation part and information about a magnification of the objective lens that is currently disposed on the optical path, an observation magnification at which a number of the at least one observation region into which the observation range is divided is minimized and a resolution is maximized, and changes a zoom magnification based on the calculated observation magnification, and
when the change mode is selected, the observation-range adjustment unit calculates, based on the information about at least one of the radius and the diameter of the accommodation part and information about respective magnifications of the plurality of objective lenses, the observation magnification at which the number of the at least one observation region into which the observation range is divided is minimized and the resolution is maximized, and changes, based on the calculated observation magnification, (i) an objective magnification by controlling which of the plurality of objective lenses is disposed on the optical path and (ii) the zoom magnification.

6. The microscope system according to claim 5, further comprising a scanner that scans, on the specimen, illumination light produced by a light source,
wherein the observation-range adjustment unit changes the zoom magnification, which is a zoom magnification of the scanner, based on the calculated observation magnification.

7. The microscope system according to claim 5, further comprising a variable-magnification optical system,
wherein the observation-range adjustment unit changes the zoom magnification, which is a zoom magnification of the variable-magnification optical system, based on the calculated observation magnification.

8. The microscope system according to claim 5, further comprising a stage on which the specimen is placed, the stage being movable in a direction intersecting an optical axis of the objective lens,
wherein the computer is further configured to operate as a stage control unit that moves, for each of the at least one observation region divided by the observation-range adjustment unit, the stage so as to locate the optical axis of the objective lens at a center of that observation region.

9. A microscope system comprising:
a plurality of objective lenses that are selectively used to collect observation light from a specimen, each of the plurality of objective lenses being able to be selectively disposed on an optical path of the observation light;
a camera that acquires an image of the specimen based on the observation light collected by the objective lens;
a vessel that includes an accommodation part for accommodating the specimen; and
a computer that is configured to operate as:
a mode selecting unit by which a user can select between (i) a fixed mode in which the objective lens, from among the plurality of objective lenses, that is currently disposed on the optical path is used, and (ii) a change mode in which one of the plurality of objective lenses is selected and used; and
an observation-range adjustment unit that sets a range including an entirety of the accommodation part as an observation range and that divides the observation range into at least one observation region, each of the at least one observation region corresponding to a capture range captured by the camera, wherein:
when the fixed mode is selected, the observation-range adjustment unit calculates, based on information about at least one of a radius and a diameter of the accommodation part and information about a magnification of the objective lens that is currently disposed on the optical path, an observation magnification at which a number of the at least one observation region into which the observation range is divided is minimized and a resolution is maximized, and changes a zoom magnification based on the calculated observation magnification, and
when the change mode is selected, the observation-range adjustment unit calculates, based on the information about at least one of the radius and the diameter of the accommodation part and information about respective magnifications of the plurality of objective lenses, the observation magnification at which the number of the at least one observation region into which the observation range is divided is minimized and the resolution is maximized, and changes, based on the calculated observation magnification, (i) an objective magnification by controlling which of the plurality of objective lenses is disposed on the optical path and (ii) the zoom magnification.

10. The microscope system according to claim 9, further comprising a scanner that scans, on the specimen, illumination light produced by a light source,
wherein the observation-range adjustment unit changes the zoom magnification, which is a zoom magnification of the scanner, based on the calculated observation magnification.

11. The microscope system according to claim 9, further comprising a variable-magnification optical system,
wherein the observation-range adjustment unit changes the zoom magnification, which is a zoom magnification of the variable-magnification optical system, based on the calculated observation magnification.

12. The microscope system according to claim 9, further comprising a stage on which the specimen is placed, the stage being movable in a direction intersecting an optical axis of the objective lens,
wherein the computer is further configured to operate as a stage control unit that moves, for each of the at least one observation region divided by the observation-range adjustment unit, the stage so as to locate the optical axis of the objective lens at a center of that observation region.

\* \* \* \* \*